US010141673B2

(12) United States Patent
Norton et al.

(10) Patent No.: US 10,141,673 B2
(45) Date of Patent: Nov. 27, 2018

(54) DETECTION OF A PLUG COUPLED TO A CONNECTOR HOUSING (71) Applicant: HEWLETT PACKARD ENTERPRISE DEVELOPMENT LP, Houston, TX (US)

(72) Inventors: John Norton, Houston, TX (US); Kevin B Leigh, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/325,441

(22) PCT Filed: Jul. 30, 2014

(86) PCT No.: PCT/US2014/048863
§ 371 (c)(1),
(2) Date: Jan. 10, 2017

(87) PCT Pub. No.: WO2016/018295
PCT Pub. Date: Feb. 4, 2016

(65) Prior Publication Data
US 2017/0162973 A1 Jun. 8, 2017

(51) Int. Cl.
H01R 24/00 (2011.01)
H01R 13/443 (2006.01)
(Continued)

(52) U.S. Cl.
CPC ......... H01R 13/443 (2013.01); H01R 13/641 (2013.01); H04L 12/6418 (2013.01); G06F 1/20 (2013.01); H01R 13/658 (2013.01)

(58) Field of Classification Search
CPC . H04L 12/6418; H01R 13/658; H01R 13/641; H01R 13/443; G06F 1/20
(Continued)

(56) References Cited

U.S. PATENT DOCUMENTS 4,836,794 A    6/1989 Barr
6,062,892 A    5/2000 Meng
(Continued)

FOREIGN PATENT DOCUMENTS

EP    1365485 A1    11/2003
JP    20090093137    12/2006
KR    1020120064362    6/2012

OTHER PUBLICATIONS

"EMI Shielding Applications for Power Connectors," Retrieved from internet Apr. 21, 2015, 1 pp., <http://www.reblingplastics.com/powerconnectors/application-emi_shield.html>.
(Continued)

Primary Examiner — Abdullah Riyami
Assistant Examiner — Nelson R Burgos-Guntin
(74) Attorney, Agent, or Firm — Hewlett Packard Enterprise Patent Department (57) ABSTRACT Examples herein disclose a plug coupleable to a connector housing on a computing device. The examples disclose an electrical contact supported by the plug, the electrical contact interfaceable with a connector pin in the connector housing, wherein the computing device is to detect the interfaceability of the electrical contact with the connector pin, the detection of the interfaceability is to indicate an installation of the plug within the connector housing.

13 Claims, 7 Drawing Sheets (51) Int. Cl.
H04L 12/64 (2006.01)
H01R 13/641 (2006.01)
G06F 1/20 (2006.01)
H01R 13/658 (2011.01)

(58) Field of Classification Search
USPC .................................. 439/489, 490, 955
See application file for complete search history.

(56) References Cited

U.S. PATENT DOCUMENTS

| | | |
|---|---|---|
| 6,220,895 B1 | 4/2001 | Lin |
| 7,150,638 B1 | 12/2006 | Fonville |
| 8,251,748 B2 | 8/2012 | Tyler |
| 8,625,292 B2* | 1/2014 | Snider .................... H04B 1/082 |
| | | 235/472.02 |
| 2003/0203675 A1 | 10/2003 | McDougall |
| 2003/0220000 A1 | 11/2003 | Ward et al. |
| 2007/0015416 A1* | 1/2007 | Gutierrez ............... H01R 24/64 |
| | | 439/676 |
| 2009/0093137 A1 | 4/2009 | Badehi |
| 2010/0214733 A1* | 8/2010 | Suffern .............. H05K 7/20145 |
| | | 361/679.46 |
| 2011/0228475 A1* | 9/2011 | Anderl ............... H05K 7/20727 |
| | | 361/691 |
| 2013/0212867 A1 | 8/2013 | Bodette |
| 2013/0288502 A1* | 10/2013 | Bridges .................... G06F 1/20 |
| | | 439/325 |
| 2014/0198446 A1* | 7/2014 | Tang ........................ G06F 1/16 |
| | | 361/679.32 |
| 2014/0204523 A1* | 7/2014 | Yang ........................ G06F 1/20 |
| | | 361/679.31 |
| 2015/0169012 A1* | 6/2015 | Saez ...................... G06F 1/181 |
| | | 361/679.31 |
| 2015/0359138 A1* | 12/2015 | Cho ........................ G06F 1/185 |
| | | 361/692 |
| 2016/0032358 A1* | 2/2016 | Buse ...................... G01N 35/04 |
| | | 435/6.12 |

OTHER PUBLICATIONS

PCT/ISA/KR, International Search Report dated Apr. 24, 2015 PCT/US2014/048863, 12 pps.

* cited by examiner

DETECTION OF A PLUG COUPLED TO A CONNECTOR HOUSING

BACKGROUND

Over the years, various types of computer connectors and/or ports have been introduced and modified to fits the needs of the computing community.

BRIEF DESCRIPTION OF THE DRAWINGS

In the accompanying drawings, like numerals refer to like components or blocks. The following detailed description references the drawings, wherein.

DETAILED DESCRIPTION

A computer connector and/or port is a device which may join together various peripheral components to the computer. As such, an electrical component may regulate the connector and/or port to determine when a peripheral electrical device is present in a connector housing. Such peripheral devices include, by way of example, a cable, transceiver, or other type of electrical device. However the electrical component may not be able to detect if a blank insert, such as a plug, is present. Additionally, without detecting the presence of the plug, the computing system may continue to power up and operate hardware components, such as networking switches, which produce much heat. When these networking switches produce heat, the heated airflow may continue to flow out of the computer connector and/or port. As such, fans within the computing system may pull this heated airflow through an open computer connector and/or port, thus producing in an inefficient cooling system. For example, the connector may have a previously installed transceiver, thus when the transceiver is removed, this creates an inefficient airflow by leaving the connector housing open for pulling in heated air. Further, if the hardware components within the computing system are in operation, this may create an electromagnetic field which may produce leakage which may interfere with other components near the open connector.

To address these issues, examples disclosed herein provide a plug with an electrical contact. The electrical contact interfaces with a connector pin in a connector housing in such a manner that a closed circuit is created upon the interface between the electrical contact and the connector pin. This closed circuit signals to a processor a presence and/or installation of the plug with the connector housing. In this manner, the processor detects the presence of the plug prior to powering up a networking switch. The presence of this plug prior to powering op the networking switch ensures an efficient mechanism in which to cool the networking switch. The plug provides a closed connector in the sense a heated airflow may not be drawn back through the connector housing to cool the networking switch. Rather, a fan associated with the connector housing may pull air from elsewhere thus enabling cooler air to provided across the networking switch. Installing the plug enables the cooler airflow which helps remedy the heated airflow situation when the transceiver may be removed.

Additionally, the plug may be installed with the connector housing in such a manner which provides a sealant against the airflow coming in through an open connector housing. This further ensures a proper airflow occurs for cooling the networking switch and other electrical components associated with the connector housing.

In another example discussed herein, the plug supports an electromagnetic interference (EMI) shield to prevent leaking of an EMI field to other electrical components. In this example, the EMI shield is located on the plug such that when the plug is installed with the connector housing, the EMI shield also aligns with a grounding clip located on the connector housing. The EMI shield, by way of example, consists of a strip of conductive material which connects or interfaces with the grounding clip within the connector housing. The grounding clip may also consist of conductive material which carries the electromagnetic field within the connector housing to ground. As such, placement of the EMI shield in connection with the grounding clip prevents the leakage of the electromagnetic interference which may interfere with other hardware components surrounding the connector housing.

Figure 1A:
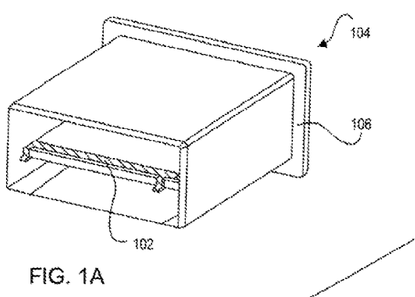
FIGS. 1A-1C are illustrations of an example plug from various perspectives, the plug is coupleable to a connector housing through an connection of an electrical contact supported by the plug and a connector pin within the connector housing.
Figure 1B:
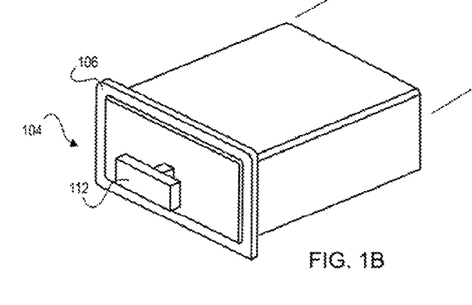
Figure 1C:
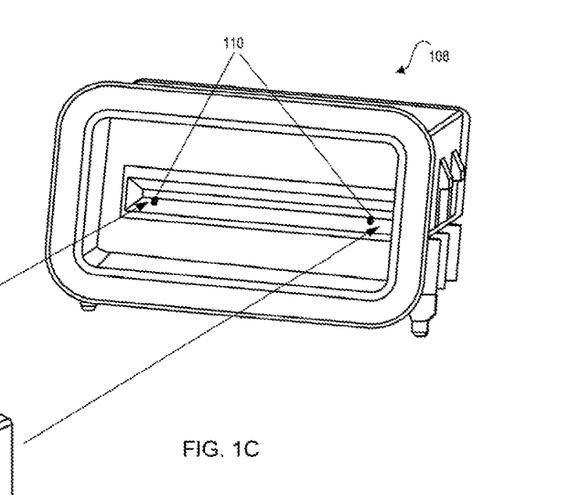

Referring now to the figures, FIGS. 1A-1C illustrate a plug 104 from various perspectives and a connector housing 108 to receive the plug 104. The plug 104 supports an electrical contact 102 to interface with a connector pin 110 located in a connector housing 108. The electrical contact 102 interfaces with the connector pin 110 in such a manner that the electrical contact 102 is coupled to the connector pin 110 to create a closed. electrical connection. Creating this closed electrical connection, a processor (not illustrated) electrically connected to the connector housing 108 detects a presence of the plug 104 in the connector housing 108. The presence of the plug 104 in the connector housing 108 includes an installation of the plug 104 into the connector housing 108 which allows the electrical contact 102 to couple to the connector pin 110.

FIG. 1A illustrates the plug 104 supporting the electrical contact 102 from a rear perspective. The plug 104 is a mechanical structure which supports the electrical contacts 102 and the plug enclosure 106. In one implementation, the plug 104 supports these components 102 and 106 in such a manner that when the plug 104 is installed in the connector housing 108, the plug 104 may provide a seal against airflow into an open connector housing 108. In another implementation, the plug 104 may consist of non-conductive material. The non-conductive material provides an electrical insulation between the connector housing 108 and the environment In this implementation, providing the plug 104 as consisting of non-conductive material enables the plug 104 to couple to the connector housing 108 in such a manner that does not create a flow of power between the connector housing 108 and the plug 104. This further enables the plug 104 to provide a sealant when coupled with the connector housing 108. The non-conductive material may include, by way of example, rubber, plastic, glass, composite polymer materials, porcelain, or other type of non-conductive material. Additionally, although FIGS. 1A-1C illustrate the plug 104 as supporting the electrical contact 102 and the plug enclosure 106, this was done for illustrations purposes as the plug 104 may also support an electromagnetic interference (EMI) shield for preventing leakage of electromagnetic fields.

The electrical contact 102 is a strip of conductive material supported by the plug 104. The electrical contact 102 couples to the connector pin 110 on the connector housing 108 which creates the closed circuit between the electrical contact 102 and the connector pin 110. The electrical contact 102 consists of conductive material which enables a flow of current from the connector pin 110 through the electrical contact 102. In one implementation, upon providing the closed circuit between the electrical contact 102 and the connector pin 110 provides a signal to the processor (not illustrated). This signal indicates the presence and/or installation of the plug 104 with the connector housing 108. This implementation may be discussed in a later figure. Although FIGS. 1A-1C illustrate the electrical contact. 102 as strip of conductive material, this was done for illustration purposes as the electrical contact 102 may include multiple points of conductive material for connecting to the connector pin 110.

The plug enclosure 106 provides an overlap of non-conductive material. This overlap may create a sealant so when the plug enclosure 106 is coupled with the connector housing 108, this prevents a heated airflow from being drawn through the connector housing 108. This implementation may be discussed in detail in later figures.

FIG. 1B illustrates a front perspective of the plug 104 prior to installation into the connector housing 108. In one implementation, the plug 104 may additionally support a handle 112 which provides control for coupling the plug 104 with the connector housing 108.

The handle 112 consists of non-conductive material and is a grip attached to the plug 104 for moving the plug 104 to the connector housing 108. In one implementation, the handle 112 may consist of a different material than the conductive material from the plug 104. For example, the plug 104 may consist of rubber while the handle 112 may consist of plastic.

FIG. 1C illustrates a front perspective of the connector housing 108. The connector housing 108 includes the connector pin 110 which interacts with the electrical contact 102 on the backside of the plug 104 as in FIG. 1. This interaction enables the processor (not illustrated) electrically connected to the connector pin 110 to detect the presence of the plug 104 with the connector housing 108. In another implementation, the processor may detect when the plug 104 is absent and/or partially coupled with the connector housing 108. In this implementation, the plug 104 may he partially installed in the sense the electrical contact 102 does not create the electrical contact with the connector pin 110.

The connector housing 108 is an electro-mechanical device which represents a connector and/or port. The connector housing 108 may bring together multiple devices. As such, the connector housing 108 includes the connector and/or port, the structure to support that connector and/or port, and the various electrical connections to other electrical components. The connector housing 108 is considered part of an interconnect module which provides multiple networking switches. In this implementation, the connector housing 108 may be part of a networking system. In another implementation, the connector housing 108 may serve as providing an interface between the networking system and various electrical components, such as transceivers, cables, etc. Additionally, the connector housing 108 may consist of a male-ended or female-ended type of connection.

The connector pin 110 consists of conductive material which provides the electrical connection between the electrical contact 102 and the networking system. The connector pin 110 serves as sensor pin within the connector housing 108 to indicate to the processor when the plug 104 is installed. Although. FIG. 1C illustrates the connector pin 110 as two different pins, this was done for illustration purposes as the connector pin 110 may include a single connector pin and/or multiple connector pins 110.

Figures 2A, 2B:
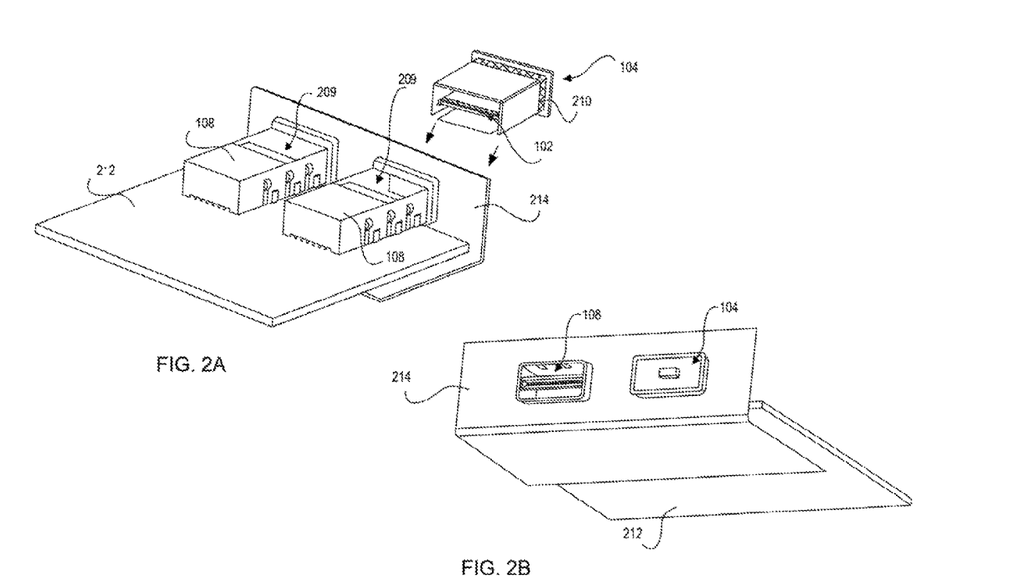
FIG. 2A is an illustration from a back perspective of an example plug supporting an electromagnetic interface (EMI) shield and an electrical contact to couple with a connector housing.
FIG. 2B is an illustration from a front perspective of an example plug as interfaced with a connector housing.

FIGS. 2A-2B are illustrations from various perspectives of a circuit board 212 and an interconnect module enclosure 214 for supporting multiple connector housings 108. The interconnect module enclosure 214 is an enclosure over an interconnect module and various networking switches supported by the interconnect module. The multiple connector housings 108 may receive a plug 104 including an electrical contact 102 and an electromagnetic interference (EMI) shield 210.

FIG. 2A illustrates the plug 104 prior to installation into one of the connector housings 108. Specifically, FIG. 2A illustrates a back side perspective of the circuit board 212 including multiple connector housings 108 which may receive the plug 104. The connector housing 108 may include an air vent opening 209 to expose the heat sink of a transceiver module (not illustrated) when it is installed in the connector housing 108. The ping 104 includes an electromagnetic interface (EMI) shield 210 and an electrical contact 102 to couple with a connector pin in one of the connector housings 108.

The circuit board 212 is a mechanical structure attached to the interconnect module enclosure 214 which supports the multiple connector housings 108 and electrically connects the multiple connector housings 108 to other components.

These electrical connections may be illustrated in a later figure. The circuit board 212 is considered part of an interconnect module which provides networking switches for a server. As such, although FIG. 2A-2B represents the circuit hoard 212 with the multiple connector housings 108, this was done for illustration purposes. For example, the circuit board 212 may include a networking switch, a fan in which to cool the networking switch, a processor, a server which responds to various requests across a computer network, and/or other type of networking components.

The interconnect module enclosure 214 is a mechanical structure which encompasses networking switches which are connected to the multiple connector housings 108. Although FIGS. 2A-2B illustrate part of the interconnect module enclosure 214, this was done for illustration purposes as the interconnect module enclosure 214 may fully enclose the circuit board 212 and other networking components.

The EMI shield 210 interacts with a grounding pin as in FIG. 2B. The grounding clip is located on the connector housing 108 and when coupled with the EMI shield 210, this prevents an electromagnetic interface (EMI) field leakage. When the grounding clip and the EMI shield 210 are aligned in such a manner that enables these components 210 to ground the EMI field. The EMI field leakage may be generated by the various networking components on the circuit board 212. As such, the EMI field may cause interference with other networking components. Thus, to prevent much of this interference, the EMI shield and the grounding clip ground the EMI field to prevent much of the EMI field leakage through the multiple connector housings 108. The EMI shield 210 is a strip of conductive material behind a lip of the plug 104. Locating the EMI shield 210 on the plug 104 enables the alignment of the EMI shield 210 with the grounding clip when the plug 104 is installed in the connector housing 108.

FIG. 2B illustrates the circuit board 212 with the multiple connector housings 108 from a front perspective. FIG. 2B represents a post-installation of the plug 104 as in FIG. 2A in one of the multiple connector housings 108.

Figure 3A:
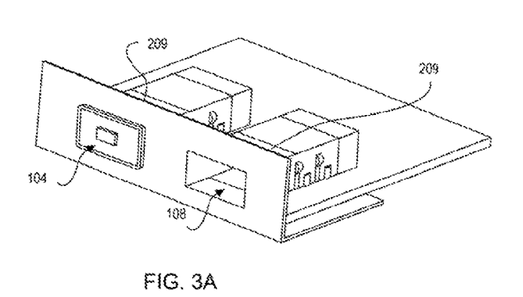
FIG. 3A is an illustration from a front perspective of an example plug coupled to a connector housing, another connector housing remains uncoupled to another plug.
Figure 3B:
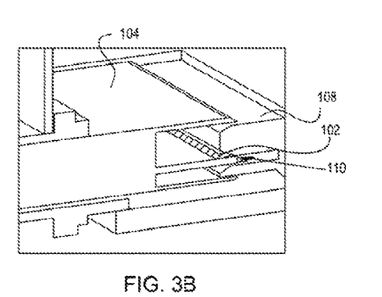
FIG. 3B is an illustration from a side perspective of an example plug supporting multiple electrical contacts for alignment with multiple connector pins in a connector housing.
Figure 3C:
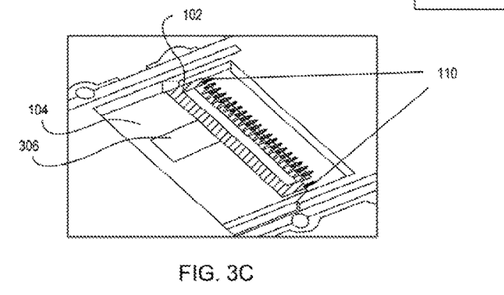
FIG. 3C is an illustration from a top perspective of an example plug including an electrical contact and an identification chip for interacting with a connector pin in a housing connector, the identification provides plug specific information to a processor.

FIGS. 3A-3C illustrate various perspectives of an example plug 104 installed into a connector housing 108. FIGS. 3A-3C illustrate the example plug 104 as coupled to the connector housing 108 in such a manner an electrical contact 102 located on the plug 104 provides a connection to a connector pin 110 within the connector housing 108.

FIG. 3A is an illustration from a front perspective of the plug 104 as installed in the connector housing 108 while another connector housing 108 remains uncoupled to another plug. For example, the plug 104 is installed in the connector housing 108 on the left hand side; however, the plug 104 is coupled to the connector housing in such a manner that the connector housing 108 is not illustrated from the front perspective. The connector housing 108 in the right hand side of the FIG. 3A represents the connector housing 108 without the plug 104. In this illustration, the connector housing 108 represents an open connector housing.

FIG. 3B is an illustration from a side perspective of a cross-sectional view of the plug 104 supporting the electrical contact 102 for alignment with the connector pin 110 in the connector housing 108. The electrical contact 102 is aligned to the connector pin 110, upon the installation of the plug 104 into the connector housing 108.

FIG. 3C is an illustration from a top perspective of a cross-sectional view of the plug 104 installed in the connector housing 108 in such a manner that the electrical contact 102 connects to the connector pins 110 within the connector housing 108. Additionally, FIG. 3C includes an identification chip 306 which enables a processor (not illustrated) to identify a type of plug 104 installed in the connector housing 108. The identification chip 306 provides specific identifying information of the plug 104 to the processor. Such identifying, information may include, by way of example, universally unique identifier (UUID), a number of electrical contacts, material of the plug 104, a number of rows within the plug 104, shape of the plug 104, whether the plug 104 supports the EMI shield, or other type of identifying information distinguishing the plug 104 among multiple plugs.

Figure 4:
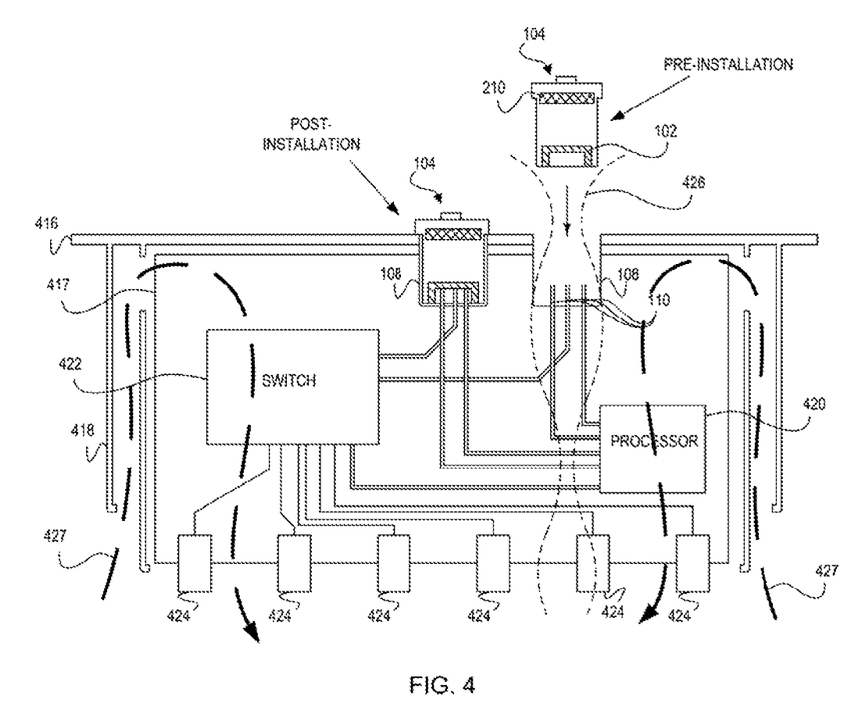
FIG. 4 is a block diagram of an example circuit including a plug coupled to a connector housing to prevent a flow of air through the connector housing, the example circuit includes a processor to detect when the plug is coupled to the connector.

FIG. 4 illustrates an example system of an interconnect module 418 within a blade server enclosure (not illustrated). The interconnect module consists of a faceplate 416, where two connector housings 108 are disposed, FIG. 4 also illustrates a plug 104 before installation and post-installation in a connector housing 108. Prior to installation of the plug 104, a heated airflow 426 enters an interconnect module 418 through an open connector housing 108. Post installation of the plug 104, prevents the heated airflow 426 from entering the interconnect module 418 by scaling the opening connector housing 108. Additionally, post-installation of the plug 104 enables a cooler airflow 427 to be directed across a networking switch 422. Upon installation of the plug 104 within the connector housing 108, an electrical contact 102 connects with a connector pin 110 within the connector housing 108 creating a closed circuit for a processor 420 to detect a presence of the plug 104 through installation of the plug 104 and as such transmits a signal indication to power up and/or change operational states of the networking switch 422. The networking switch 422 connects to a blade server through a switch port connector 424. The switch port connectors 424 provide a connection between the networking switch 422 and the blade servers (not illustrated).

When the plug 104 is installed in the connector housing 108 through an alignment of an electrical contact 102 and a connector pin 110, the plug 104 installation prevents the heated airflow 426 through the connector housing 108. In this instance, when the plug 104 is installed in the connector housing 108, the installation seals against the heated airflow 426 through the connector housing 108. Sealing the housings 108 allows cool air to he pulled through the interconnect module 418 via the airflow paths 427. Blade server enclosures (not illustrated including the fans (not illustrated) to create the airflow paths 427.

The faceplate 416 supports openings to provide the housing connectors 108. The faceplate 416 is considered a front panel to the interconnect module 418. This front panel may provide protection to the components within the interconnect module 418 from environmental aspects. Additionally, the faceplate 416 supports the connector housing 108 allowing the installation of the plug 104 into the interconnect module 418. The faceplate 416 is part of the interconnect module chassis for enclosing the hardware components in FIG. 4.

The interconnect module 413 contains a circuit board 417 which in turns contains the networking switch 422. The networking switch 422 provides packet switching to blade servers which are connected to the networking switch 422 through the switch port connectors 424. Each switch port connector 424 couples to a server blade in a blade enclosure (not illustrated). The interconnect module 418 may include, by way of example, a fan (not illustrated) which operates to cool the networking switch 422, the processor 420, and other components within the interconnect module 418 when in operation by creating the cooler airflow paths 427.

The processor 420 detects the closed circuit between the electrical contact 102 and the connector pin 110. Detecting the connection between the electrical contact 102 and the connector pin 110 indicates to the processor 420 the installation or presence of the plug 104 within the connector housing 108. Implementations of the processor 420 include, by way of example, a processing unit, host processor, microprocessor, semiconductor, integrated circuit, or other type of electronic device capable of detecting the installation of the plug 104 in the connector housing 108.

The networking switch 422 is a component which provides routing of the multiple networking packets from, or to, the switch port connectors 424. The networking switch 422 is a computer networking device which routes network packets from server blades (not illustrated) coupled via the switch port connectors 424. The server blade(s) may be located on the other side (not illustrated) of the multiple switch port connectors 424. In one implementation, when the processor 420 detects a presence or installation of the plug 104 in the connector housing 108, it transmits a signal to the networking switch 422 to power up. Powering up includes increase an amount of power drawn by the switch 422, thus enabling the networking switch 422 to receive and route packets accordingly. In another implementation, if the processor 420 detects an absence (e.g., non-installation) of the plug 104 from the connector housing 108, the processor 420 transmits the signal to the networking switch 422 to remain powered down. In this implementation, the processor 420 transmits a signal to a component within the interconnect module 418. This signal indicates to the networking switch 422 to change in operating state. For example, if the networking switch 422 is in a lower powered mode, the signal indicates the installation of the plug 104 and thus the networking switch 422 change, operating state to power up. This implementation is discussed in a later figure. In another example if the networking switch 422 has been powered down, then if the plug 104 is not installed, the networking switch 422 may remain powered down ensuring minimal heat is generated.

The processor 420 detects the installation of the plug 104 within the connector housing 108 through detecting a closed circuit connection between the electrical contact 102 on the plug 104 and the connector pin 110 on the connector housing 108. After detecting the installation of the plug 104, the processor 420 transmits a communication signal to the networking switch 422 to be powered up and start routing network packets from multiple switch port connectors 424. Implementations of the networking switch 422 include chipset, silicon chip, microchip, controller, or other type of networking switch component capable of routing the network packets from multiple switch port connectors 424.

The heated airflow 426, represents a heated airflow through the connector housing 108 when the plug 104 is not installed or prior to installation of the plug 104. The heated airflow 426 may enter the interconnect module 418 via vent opening 209. Having an uninstalled plug 104 leaves the connector housing 108 open which means heated air may be drawn by the fan (not illustrated) from the interconnect module 418 to cool the components within the interconnect module 418, such as the networking switch 422. Leaving the connector housing 108 open without the installation of the plug 104, provides an inefficient cooling system as the heated airflow 426 drawn through the connector housing MS may not be adequate to cool the networking switch 422 when this switch 422 is powered on. Installing the plug 104 in the connector housing 108, provides the seal which prevents the heated airflow 426 from entering the interconnect module 418 through the open connector housing 108. Preventing the heated airflow 426 upon the installation of the plug 104 in the connector housing 108, enables the fan (not illustrated) to pull cooler air from a side of the interconnect module 418 via the cooler airflow paths 427. Pulling in the cooler airflow 427 ensures a more efficient mechanism for cooling the switch 422 within the interconnect module 418.

Figure 5:
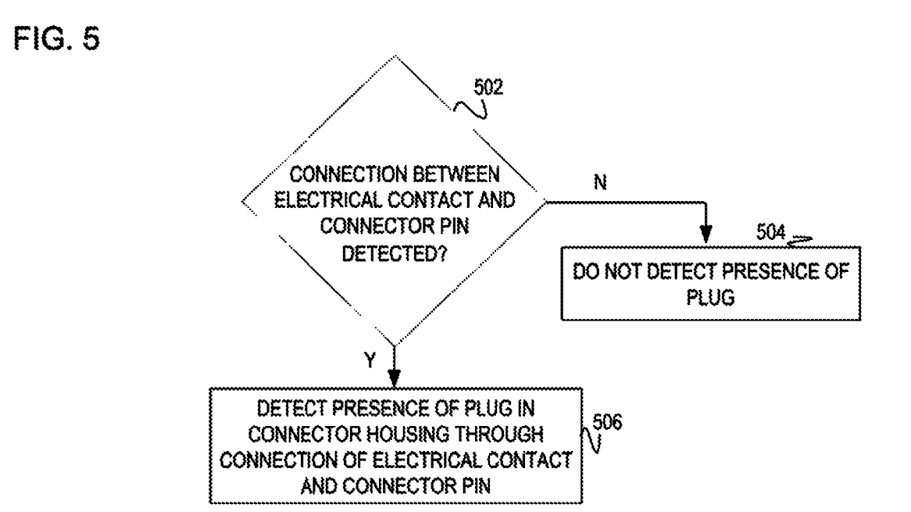
FIG. 5 is a flowchart of an example method to detect, upon a coupling of a plug with a connector housing, a connection between an electrical contact supported by the plug and connector pin supported by the connector housing, the method also detects a presence of the plug with the connector housing through the connection of an electrical contact with the connector pin.

FIG. 5 is flowchart of an example method to detect, upon a coupling of a plug with a connector housing, a connection between an electrical contact supported by the plug and connector pin supported by the connector housing. Based upon this connection, the method detects a presence of the plug. The presence of the plug, indicates an installation of the plug within the connector housing. In discussing FIG. 5, references may be made to the components in FIGS. 1-4 to provide contextual examples. For example, the processor 420 as in FIG. 4 executes operations 502-506 for detecting the presence of the plug in connection with the connector housing. In another example, a computing device executes operations 502-506. In one implementation, the computing device may include the interconnect module 418 as in FIG. 4 and as such, the interconnect module 418 may execute operations 502-506. Further, although. FIG. 5 is described as implemented by the processor, it may be executed on other suitable components. For example, FIG. 5 may be implemented in the form of executable instructions on a machine-readable storage medium.

At operation 502, the processor detects whether the connection between the electrical contact and the contact pin has been established. Operation 502 occurs upon the coupling of the plug to the connector housing. Coupling the plug to the connector housing includes, by way of example, bringing together the plug and the computing system in such a manner the connection may be established. The connection includes joining together a circuit on the plug with the circuit on the connector housing when bringing the plug together with the connector housing. If the processor determines the connection between the electrical contact and the connector pin has not been established, the processor may proceed to operation 504 and does not detect a presence of the plug with the connector housing. If the processor determines the connection between the electrical contact and the connector pin is established, the processor proceeds to operation 506 to detect the presence of the plug with the connector housing.

At operation 504, if the connection between the plug and the connector pin is not established at operation 502, the processor does not proceed to detect the presence of the plug. In one implementation operation 504 includes detecting the absence of the plug with the connector housing.

At operation 506, the processor detects the presence of the plug. The presence of the plug indicates the installation of the plug with the connector housing. In this implementation, the plug is coupled with the connector housing in such a manner that the electrical contact and the connector pin have formed a closed circuit indicating to the processor the presence of the plug. In another implementation of operation 506, the presence of the plug with the connector housing means the plug has been joined together with the computing system supporting the connector housing in such a manner that it prevents a flow of air from coming through the connector. The presence of the plug may include, by way of example, sealing the connector from an environment outside of the computing system.

Figure 6:
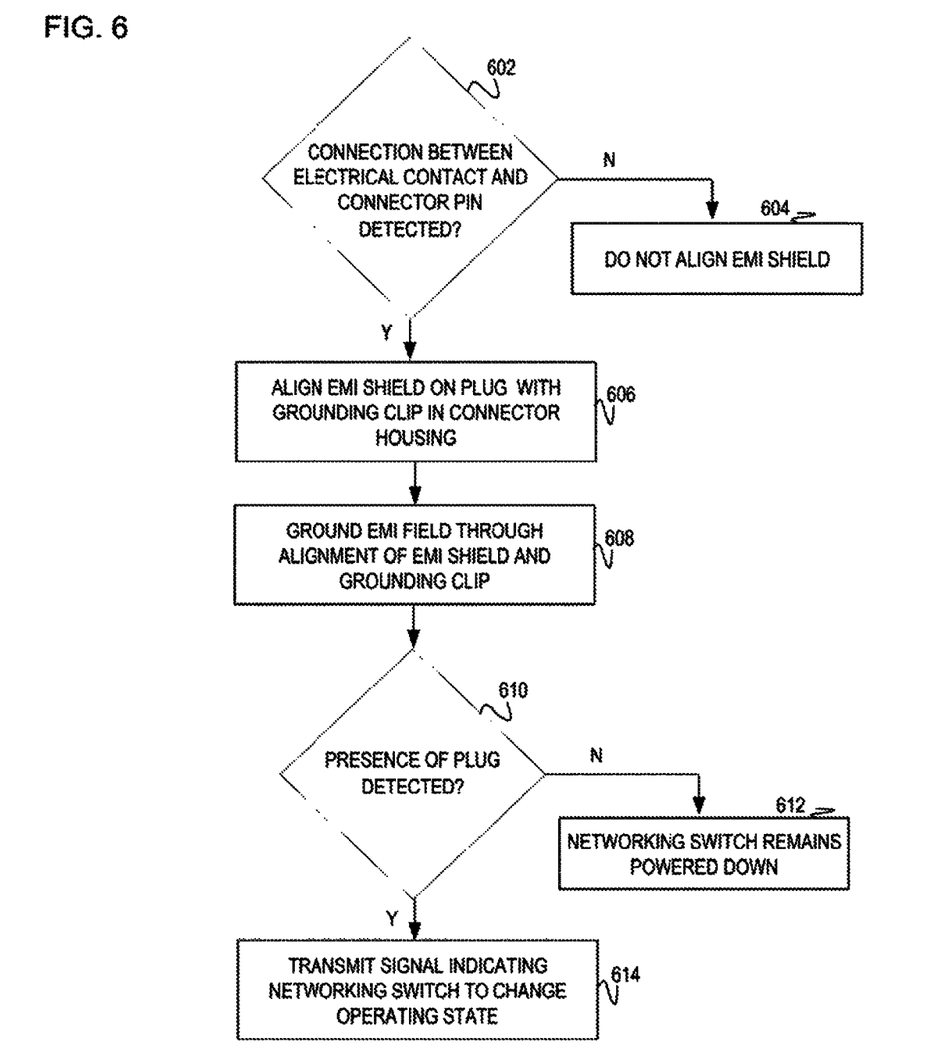
FIG. 6 is a flowchart of an example method to detect a connection between an electrical contact supported by a plug and a connector pin supported by a connector housing, the method aligns an electromagnetic interface (EMT) shield with a grounding clip in the connector housing, the method further dews a presence of the plug coupled to the connector housing and in turn powers up a networking switch associated with the connector housing.

FIG. 6 is a flowchart of an example method to detect a connection between an electrical contact supported by a plug and a connector pin supported by a connector housing. Based on whether this connection is detected, the method may proceed to align an electromagnetic interface (EMI) shield located on the plug with a grounding clip located in the connector housing. Aligning the EMI shield includes, by way of example, creating an electrical connection with the grounding clip in such a manner to prevent EMI leakage through an open connector housing. Preventing the EMI leakage minimizes the EMI fields which may interfere with other various hardware components. Additionally, the method further detects whether the plug is present in the connector housing. Based on this detected presence, the method may proceed to transmit a signal. The signal indicates to change operational states and/or change power states for a networking switch. If the plug is not detected, the networking switch may remain powered down. The connector housing is attached to a computing system and serves as a connector for interfacing with other various components. The computing system includes, by way of example, a server and/or interconnect module which houses a networking switch. Thus detecting the presence and of installation of the plug prior to changing the operational state of the networking switch ensures a more efficient mechanism for cooling the networking switch within the interconnect module. In discussing FIG. 6, references may be made to the components in FIGS. 1-4 to provide contextual examples. For example, the processor 420 as in FIG. 4 executes operations 602-614 for detecting the presence of the plug in connection with the connector housing. In another example, a computing device executes operations 602-614. In one implementation, the computing device may include the interconnect module 418 as in FIG. 4 and as such, the interconnect module 418 may execute operations 602-614. Further, although FIG. 6 is described as implemented by the processor, it may be executed on other suitable components. For example, FIG. 6 may be implemented in the form of executable instructions on a machine-readable storage medium.

At operation 602, the processor detects whether the connection between the electrical contact and the connector pin has been established. If the processor does not detect the establishment of the connection between the electrical contact and the connector pin, the method may proceed to operation 604. If the processor detects the connection between the electrical contact and the connector pin has been established, the processor may proceed to operation 606 to align the EMI shield on the plug with the grounding clip in the connector housing. Operation 602 may be similar in functionality to operation 502 as in FIG. 5.

At operation 604, the EMI shield on the plug is not connected with the grounding clip in the connector housing. Determining the connection has not been established at operation 602, the EMI shield is not aligned with the EMI shield. Determining the connection has not been established indicates the connector housing may be in the situation of an open connector. Having an open connector potentially means heated air being drawing through the open connector thus not efficiently cooling the networking switch in the interconnect: module of the computing system. Further, determining the connection has not been established may indicate the plug has not been brought together with the connector of the computing system in such a manner that prevents the flow of air through the connector. The absence of the connection indicates the plug is absent and/or partially coupled with the connector housing.

At operation 606, upon the establishment of the connection at operation 602, the EMI shield is aligned with the grounding clip in the connector housing. The EMI shield is connected to the plug in such a manner that when the connection is established at operation 602, the EMI shield may also be connected with the grounding dip. The EMI shield, by way of example, consists of a strip of conductive material which connects or interfaces with the grounding clip within the connector housing. The grounding clip may also consist of conductive material which carries the electromagnetic field within the connector housing to ground. As such, placement of the EMI shield in connection with the grounding clip prevents the leakage of the electromagnetic interference which may interfere with other hardware components surrounding the connector housing.

At operation 608, the electromagnetic field is grounded for preventing interface with other components. Operation 608 may occur simultaneously as the alignment of the EMI shield with the grounding clip at operation 606.

At operation 610, the processor detects whether the plug is present in the connector housing. In one implementation, the connection between the electrical contact and the connector pin creates a closed circuit signaling to the processor the presence of the plug in the connector housing. This implementation may be discussed in the next figure. Operation 610 may be similar in functionality to operation 506 as in FIG. 5.

At operation 612, upon detecting the absence of the plug from the connector housing, the processor transmits the signal for the networking switch to remain powered down. Transmitting the signal for the networking switch to remain powered down ensures the networking switch may not be generating excess heat. This ensures a minimal amount of heat is generated for the cooling system in the situation of an open connector that may draw in a heated airflow. Operation 612 may include, by way of example, transmitting the signal to the networking switch to remain in a standby state, power state, or other type of lower powered state.

At operation 614, upon detecting the presence of the plug with the connector housing, the processor transmits the signal to the networking switch or another component which manages the networking switch. The signal indicates for the networking switch to change operational state. For example, if the networking switch is in a low-powered state, the signal may indicate to power up the networking switch so the switch may route packets accordingly. As such in this example, the signal may include increasing the power drawn by the networking switch. Transmitting the signal for powering up the switch to power up may include instructing the networking switch to begin receiving packets and routing the packets accordingly.

Figure 7:
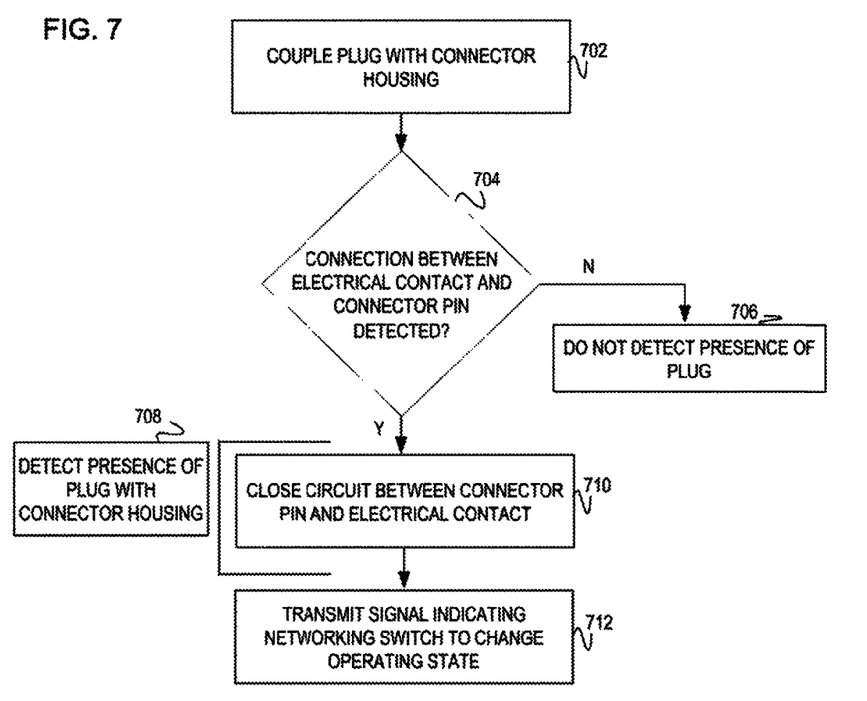
FIG. 7 is a flowchart of an example method to detect a presence of a plug within a connector housing based on a closed circuit between an electrical contact supported by the plug and a connector pin supported by the connector housing.

FIG. 7 is a flowchart of an example method, upon a coupling of a plug with a connector housing, to detect a connection between an electrical contact supported by the plug and a connector pin supported by the connector housing. If the method detects this connection, the method may proceed to detect a presence of the plug with the connector housing. Otherwise, if the method does not detect the connection, the method does not detect the presence of the plug with the connector housing. The presence of the plug with the connector includes closing a circuit between the electrical contact and the connector pin. The closed circuit allows a processor to detect the closed circuit which indicates the presence of the plug. Upon dosing the circuit between the electrical contact and the connector pin, the processor transmits a signal indicating to a networking switch to power up or change operational state. Waiting to power up and/or change operation state of the networking switch until detecting the installation of the plug with the connector housing, provides a more efficient mechanism for cooling the networking switch. For example, when the networking switch is powered up, it may generate more heat, thus the presence of the plug prevents the heated airflow back through the connector housing and enables a more efficient cooler airflow. In discussing FIG. 7, references may be made to the components in FIGS. 1-4 to provide contextual examples. For example, the processor 420 as in FIG. 4 executes operations 702-712 for detecting the presence of the plug in connection with the connector housing. In another example, a computing device executes operations 702-712. In one implementation, the computing device may include the interconnect module 418 as in FIG. 4 and as such, the interconnect module 418 may execute operations 702-712. Further, although FIG. 7 is described as implemented by the processor, it may be executed on other suitable components. For example, FIG. 7 may be implemented in the form of executable instructions on a machine-readable storage medium.

At operation 702, the plug is coupled with the connector housing. Coupling the plug with the connector housing includes bringing together the two components (i.e., the plug and the connector housing). Bringing together these components, allows the plug and the connector housing to interface with each other. The plug and connector housing interface with each other by connecting the electrical contact on the plug with the connector pin on the connector housing. Operation 702 may include aligning the electrical contact with the connector pin for the processor to detect the connection at operation 704. Upon coupling the plug with the connector housing, the processor detects whether the connection was produced between the electrical contact and the connector pin as at operation 704.

At operation 704, the processor may detect whether the connection between the electrical contact supported by the plug and the connector pin supported by the connector housing is established. If the processor detects the absence of the connection between the electrical contact and the connector pin, the processor may proceed to operation 706 and does not detect the presence of the plug with the connector housing. The reason for this is the absence of connection indicates the plug is absent from the connector housing. Thus, the processor will be unable to detect the presence of the plug with the connector housing. If the processor is successful in detecting the connection between the electrical contact and the connector pin, the processor proceeds to operation 708 to detect the presence of the plug with the connector housing.

At operation 706, the processor does not detect the presence of the plug with the connector housing. As explained in connection with operation 704, the absence of the connection between the electrical contact and the switch pin indicates the absence of the plug with the connector housing. The absence of the plug may include, by way of example, the plug and the connector housing were not joined together in such a manner to allow the connection at operation 704. For example, the plug may be partially coupled with the connector housing, which may not enable the connection between the electrical contact and the connector housing.

At operation 708, the processor detects the presence of the plug with the connector housing. In one implementation, the processor detects the presence of the plug through a closed circuit between the electrical contact and the connector pin supported by the connector housing as at operation 710. Operation 708 may be similar in functionality to operations 506 and 610 as in FIGS. 5-6.

At operation 710, the processor receives a signal indicating the closed circuit between the electrical contact and the connector pin. Enabling the processor to receive the signal of the dosed circuit indicates the presence of the plug with the connector housing. In one implementation, operation 710 occurs simultaneously with operation 708. For example, the processor detects the presence of the plug through the signal of the closed circuit. In another implementation, operation 710 occurs prior to detecting the presence of the plug. The connector pin serves as a type of sensing pin which signals to the processor the closed circuit between the connector pin and the electrical contact. The connection of the closed circuit signifies to the processor the plug is present.

At operation 712, upon detecting the presence of the plug with the connector housing at operation 708, the processor transmits the signal to the networking switch or another component which manages the networking switch. The signal indicates for the networking switch to power up and/or change operational state. In one implementation, the networking switch may be operating with minimal power such as in a standby state. Thus to increase functioning, the networking switch may pull additional power to enable the additional functioning. In another implementation, the networking switch may be in an off-state drawing no power, thus upon powering up, the networking switch may be pulling the increase of power to increase functionality Operation 712 may be similar in functionality to operation 614 as in FIG. 6.

We claim:

1. An apparatus comprising:
 a plug coupleable to a connector housing on a computing device, wherein the computing device includes:
  a first airflow path based on the plug being coupled to the connector housing that prevents airflow through the connector housing; and
  a second airflow path based on an absence of the plug being coupled to the connector housing such that air flows through the connector housing;
 an electrical contact supported by the plug, the electrical contact interfaceable with a connector pin in the connector housing, wherein the computing device:
  detects whether the plug is coupled to the connector housing based on whether the electrical contact is interfaced with the connector pin; and
  controls an operating state of a network switch that corresponds to the connector housing based on whether the plug is coupled to the connector housing, including causing the network switch to power down in response to detecting that the plug is not coupled to the connector housing.

2. The apparatus of claim 1 wherein the plug is coupleable to the connector housing through an alignment of the electrical contact with the connector pin to prevent a flow of air through the connector housing.

3. The apparatus of claim 1 comprising:
 an electromagnetic interference (EMI) shield interfaceable with a grounding clip in the connector housing for grounding an electromagnetic interface field through the connector housing.

4. The apparatus of claim 1 wherein upon the electrical contact interfacing with the connector pin, a circuit is closed between the connector pin and the electrical contact, and the computing device detects that the electrical contact is interfered with the connector pin based on the closing of the circuit.

5. The apparatus of claim 1 wherein the plug consists of non-conductive material.

6. A system comprising:
    a connector housing with a connector pin coupleable to a plug, wherein:
        a first airflow path is based on the plug being coupled to the connector housing such that the plug prevents airflow through the connector housing;
        a second airflow path is based on an absence of the plug being coupled to the connector housing such that air flows through the connector housing; and
        the plug supports an electrical contact interfaceable with the connector pin within the connector housing;
    a processor to:
        detect whether the plug is coupled with the connector housing based on whether the electrical contact is interfaced with the connector pin; and
        controls an operating state of a network switch that corresponds to the connector housing based on whether the plug is coupled to the connector housing, including causing the network switch to power down in response to detecting that the plug is not coupled to the connector housing.

7. The system of claim 6 comprising:
    the network switch; to the connector housing
    wherein the processor is to cause the network switch to power up in response to detecting that the plug is coupled with the connector housing.

8. The system of claim 6 wherein the processor detects the coupling of the plug and the connector housing through a closing of a circuit between the connector pin and the electrical contact.

9. The system of claim 6 wherein the plug supports an electromagnetic interface (EMI) shield interactable with a grounding pin on the connector housing, wherein interaction of the EMI shield with the ground pin is to prevent an electromagnetic interface (EMI) field leakage through the connector housing.

10. The system of claim 6 wherein the plug supports an identification chip and wherein the processor is to identify a type of the plug upon the plug interfacing with the connector pin.

11. A method, executable by a computing device, the method comprising:
    determining whether a connection between an electrical contact supported by a plug and a connector pin supported by a connector housing exists;
    detecting, in response to determining the connection between the electrical contact and the connector pin exists, a presence of the plug in the connector housing through the connection of the electrical contact with the connector pin;
    transmitting, in response to determining the connection between the electrical contact and the connector pin exists, a signal to change an operating state of a network switch to a powered on state; and
    transmitting, in response to determining the connection between the electrical contact and the connector pin does not exist, a signal to change an operating state of the network switch to a powered off state.

12. The method of claim 11 wherein detecting the presence of the plug in the connector housing through the connection of the electrical contact with the connector pin further comprises:
    detecting a closing of a circuit between the connector pin and the electrical contact.

13. The method of claim 11 comprising:
    aligning an electromagnetic interface (EMI) shield, coupled to the plug, with a grounding clip within the connector housing; and
    grounding an electromagnetic interface (EMI) field through an alignment of the EMI shield and the grounding clip.

* * * * *